United States Patent
Persson et al.

(10) Patent No.: US 10,051,453 B2
(45) Date of Patent: Aug. 14, 2018

(54) WEARABLE AND/OR HAND-HELD MOBILE ELECTRONIC DEVICE AND METHOD FOR DIRECTIONAL PROXIMITY DETECTION

(71) Applicant: Sony Corporation, Tokyo (JP)

(72) Inventors: Magnus Persson, Flyinge (SE); Hakan Jonsson, Malmo (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 14/535,645

(22) Filed: Nov. 7, 2014

(65) Prior Publication Data

US 2016/0134336 A1    May 12, 2016

Related U.S. Application Data

(63) Continuation of application No. PCT/IB2013/002471, filed on Nov. 7, 2013.

(51) Int. Cl.
*H04W 24/00* (2009.01)
*H04W 8/00* (2009.01)
*H04W 4/02* (2018.01)

(52) U.S. Cl.
CPC .......... *H04W 8/005* (2013.01); *H04W 4/025* (2013.01)

(58) Field of Classification Search
CPC ....... H04B 7/028; H04W 4/025; H04W 8/005
See application file for complete search history.

(56) References Cited

U.S. PATENT DOCUMENTS

2004/0165076 A1* 8/2004 Nishimura ......... H04N 1/00281
                                                              348/211.2
2008/0150798 A1* 6/2008 Curry ..................... H01Q 3/36
                                                              342/359
(Continued)

FOREIGN PATENT DOCUMENTS

WO          9627804 A1       9/1996

OTHER PUBLICATIONS

International Search Report from corresponding International Application No. PCT/IB2013/002471, dated Mar. 31, 2014.

*Primary Examiner* — Keith Fang
(74) *Attorney, Agent, or Firm* — Renner Otto Boisselle and Sklar

(57) ABSTRACT

This disclosure concerns wearable and/or handheld mobile electronic devices and methods for directional proximity detection of other wearable and/or handheld mobile electronic devices. A first wearable and/or handheld mobile electronic device (1) for directional proximity detection comprises a signal transceiver configured for wireless communication, and a control unit for the wireless communication. The control unit is operatively connected to the signal transceiver and configured to receive at least one wireless signal from a second wearable and/or handheld mobile electronic device (2), calculate spatial information regarding the second wearable and/or handheld mobile electronic device by means of the signal/-s transmitted from the second wearable and/or handheld mobile electronic device to the first wearable and/or handheld mobile electronic device, and configure a notification for the user of the first wearable and/or handheld mobile electronic device based on at least the spatial information regarding the second wearable and/or handheld mobile electronic device.

22 Claims, 7 Drawing Sheets

(56) References Cited

U.S. PATENT DOCUMENTS

| | | | |
|---|---|---|---|
| 2010/0120379 A1* | 5/2010 | Fukagawa | H01Q 1/2266 455/90.2 |
| 2011/0268300 A1* | 11/2011 | DeMers | H04R 5/04 381/309 |
| 2012/0082039 A1 | 4/2012 | Li et al. | |
| 2013/0044005 A1 | 2/2013 | Forshee et al. | |
| 2014/0045422 A1* | 2/2014 | Qi | H04W 76/023 455/39 |
| 2014/0256373 A1* | 9/2014 | Hernandez | H04B 17/12 455/509 |

\* cited by examiner

WEARABLE AND/OR HAND-HELD MOBILE ELECTRONIC DEVICE AND METHOD FOR DIRECTIONAL PROXIMITY DETECTION

CROSS-REFERENCE TO RELATED APPLICATION

This is a continuation in part of PCT application no. PCT/IB2013/002471 filed Nov. 7, 2013, the priority from which is claimed, and the entire disclosure of which hereby is incorporated by reference.

TECHNICAL FIELD

The present invention relates to wearable and/or handheld mobile electronic devices and methods for directional proximity detection of other wearable and/or handheld mobile electronic user devices communicating wirelessly.

BACKGROUND ART

In recent years, there has been a large interest in developing technology for determining the position of user devices. The most commonly used method is GPS (Global positioning system), in which satellites are used to obtain the position of a mobile device. However, this method is not suitable for indoor use since this causes the building structure to obstruct the GPS signal and makes it unable to reach the mobile device. Furthermore, there is technology developed for indoor positioning using a stationary beacon device that enables positioning by sending a signal that is able to reach the mobile devices in the near surrounding of the beacon and thereby allowing the devices to attain position information.

The present invention is aimed at providing improvements to these technologies and to provide technology for proximity positioning of mobile wireless devices without the need for a separate beacon or a GPS signal.

SUMMARY OF THE INVENTION

With the above description in mind, then, an aspect of the present invention is to provide a wearable and/or handheld mobile electronic device for directional proximity detection of a second wearable and/or handheld mobile electronic device and for presenting in the first wearable and/or handheld mobile electronic device, information regarding the second wearable and/or handheld mobile electronic device and to notify a user of the first wearable and/or handheld mobile electronic device of the second wearable and/or handheld mobile electronic device and its whereabouts. The invention also provides a method for such directional proximity detection.

These and further objects are achieved by a first wearable and/or handheld mobile electronic device for directional proximity detection, comprising an antenna array operatively connected to a signal transceiver configured for wireless communication, a control unit comprising software and memory for the wireless communication, wherein the control unit is operatively connected to the signal transceiver, and wherein the control unit is configured to receive, by means of the antenna array and the signal transceiver, at least one wireless signal from a second wearable and/or handheld mobile electronic device, and to calculate spatial information regarding the second wearable and/or handheld mobile electronic device by means of the signal/-s transmitted from the second wearable and/or handheld mobile electronic device to the first wearable and/or handheld mobile electronic device, and to configure a notification for the user of the first wearable and/or handheld mobile electronic device based on at least the spatial information regarding the second wearable and/or handheld mobile electronic device, and to notify the user of the first wearable and/or handheld mobile electronic device of the second wearable and/or hand-held mobile electronic device. By providing a wearable and/or handheld mobile electronic device according to the above, a user of the first wearable and/or handheld electronic device is able to be notified of the presence of the second wearable and/or handheld mobile electronic device, e.g. its whereabouts, such as a relative direction and be presented with information regarding the second detected wearable and/or handheld mobile electronic device. The form or type of notification may be graphical, optical (rendering on a display, e.g. visors), haptic, tactile (in the form of vibrations), and/or audible (sounds in speaker of a smart phone or in ear phones), which notification may be only information of the identity of the other mobile device or of its relative direction and/or distance in a one-way communication or the start of a two-way communication between the at least two devices. Hence, this notification may be realized in a very simple and quick way to and for the user of the first wearable and/or handheld mobile electronic device enabling the user to for example choose a desirable action or the device may be predeterminately set to perform a certain desirable action or switch on or off a certain function of the first wearable and/or handheld mobile device. Furthermore, the direction can be calculated with high accuracy without having to rely on satellites or external antennas i.e. the spatial information regarding the mobile electronic device can be determined by the first wearable and/or handheld mobile electronic device alone.

According to one aspect of the disclosure, it provides a first wearable and/or handheld mobile electronic device, wherein the first wearable and/or handheld mobile electronic device is a mobile phone. By providing a mobile phone according to the invention, the user of the mobile phone can be notified with spatial information regarding a second wearable and/or handheld mobile electronic device. Furthermore, the user of the mobile phone can easier be informed of the spatial information of other wearable and/or handheld mobile electronic devices and receive information regarding said other wearable and/or handheld mobile electronic devices.

According to one further aspect of the disclosure, it provides a first wearable and/or hand-held mobile electronic device, wherein the first wearable and/or handheld mobile electronic device is a visor. By providing visors according to the invention the user of the visors can be notified with spatial information regarding a second wearable and/or handheld mobile electronic device. Furthermore, the user of the mobile phone can easier determine the spatial information of other wearable and/or handheld mobile electronic devices and receive information regarding said other wearable and/or handheld mobile electronic devices by enabling the information to be rendered in the view of the user of the visors.

According to another aspect of the disclosure, the antenna array of the first wearable and/or handheld mobile electronic device faces in substantially the same direction as the user is facing. By providing a wearable and/or handheld mobile electronic device with the antenna array facing in substantially the same direction as the user is facing, other wearable and/or handheld mobile electronic devices that are located in the direction that the user of the first wearable and/or handheld mobile electronic device is facing can be detected by the antenna array. The accuracy of the calculation of the spatial information of the other wearable and/or handheld mobile electronic devices is improved and the notifications can be made more accurate accordingly.

According to yet another aspect of the disclosure, a first wearable and/or handheld mobile electronic device is provided, wherein the antenna array is arranged to receive signals originating from the second wearable and/or handheld mobile electronic device in the front view of the user. By providing a wearable and/or handheld mobile electronic device in which the antenna array is arranged to receive signals originating from the second wearable and/or handheld mobile electronic device in the front view of the user, other wearable and/or handheld mobile electronic devices that are located in the front view of the first wearable and/or handheld mobile electronic device can be detected.

According to a further aspect of the disclosure, a first wearable and/or handheld mobile electronic device is provided, wherein the antenna array faces a direction being substantially perpendicular to the direction the user is facing. By providing an antenna array that faces in direction perpendicular to the direction the user is facing, the antenna array can detect and notify the user of the other wearable and/or handheld mobile electronic devices that are located to either side of the user.

According to yet another aspect of the disclosure, a wearable and/or handheld mobile electronic device is provided, wherein the antenna array faces in a direction being substantially opposite the direction the user is facing. By providing a wearable and/or handheld mobile electronic device, e.g. visors, in which the antenna array faces in a direction being substantially opposite the direction the user is facing, i.e. in the rear view of the user, other wearable and/or handheld mobile electronic devices that are located at the rear view of the wearable and/or handheld mobile electronic device can be detected.

According to another aspect of the disclosure, a first wearable and/or handheld mobile electronic device is provided, wherein the antenna array is arranged to receive signals originating from the second wearable and/or handheld mobile electronic device located at the rear of the user. By providing a wearable and/or handheld mobile electronic device, e.g. visors, in which the antenna array is arranged to receive signals originating from the second wearable and/or hand-held mobile electronic device located at the rear of the user, i.e. in the rear view of the user, other wearable and/or handheld mobile electronic devices that are located at the rear of the first wearable and/or handheld mobile electronic device can be detected.

According to one aspect of the disclosure, a first wearable and/or handheld mobile electronic device is provided, wherein at least one antenna array is arranged on the visor substantially in parallel or in parallel with the sidepieces/bows of the visor. By providing a wearable and/or hand-held mobile electronic device, e.g. visors, in which at least one antenna array is arranged on the visor substantially in parallel with or in parallel with the sidepieces/bows of the visor, spatial information comprising distance and direction of other wearable and/or handheld mobile electronic devices around the first wearable and/or handheld mobile electronic device can be detected.

According to a further aspect of the disclosure, a first wearable and/or handheld mobile electronic device is provided, wherein at least one antenna array is arranged on the visor substantially vertically or vertically in relation to the longitudinal direction of the sidepieces/bows of the visor. By providing a wearable and/or handheld mobile electronic device, e.g. visors, in which at least one antenna array is arranged on the visor substantially vertically or vertically in relation to the longitudinal direction of the sidepieces/bows of the visor, the vertical position and height of other wearable and/or handheld mobile electronic devices around the first wearable and/or handheld mobile electronic device can be detected.

According to one further aspect of the disclosure, it provides a first wearable and/or hand-held mobile electronic device, wherein at least one antenna array is arranged on the visor substantially in parallel or in parallel with the sidepieces/bows of the visor and at least one antenna array is arranged on the visor substantially vertically or vertically in relation to the longitudinal direction of the sidepieces/bows of the visor. By providing a wearable and/or handheld mobile electronic device, e.g. visors, in which at least one antenna array is arranged substantially in parallel or in parallel with the sidepieces/bows of the visor and at least one antenna array is arranged on the visor substantially vertically or vertically in relation to the longitudinal direction of the sidepieces/bows of the visor, spatial information comprising distance and/or direction and/or vertical positions of other wearable and/or handheld mobile electronic devices around the first wearable and/or handheld mobile electronic device can be detected.

The above and further objects are achieved by a visor for directional proximity detection, comprising an antenna array operatively connected to a signal transceiver configured for wireless communication, and a control unit comprising software and memory for the wireless communication, wherein the control unit is operatively connected to the signal transceiver and configured to receive, by means of the antenna array and the signal transceiver, at least one wireless signal from a second handheld mobile electronic device; to calculate spatial information comprising distance and/or direction and/or vertical position regarding the second handheld mobile electronic device by means of the signal/-s transmitted from the second handheld mobile electronic device to the visor; to configure a notification for the user of the visor based on at least the spatial information regarding the second handheld mobile electronic device, and to notify the user of the visor of the second handheld mobile electronic device.

According to yet another aspect of the disclosure, a first wearable and/or handheld mobile electronic device is provided, wherein the first wearable and/or handheld mobile electronic device is a wireless hands-free device. By providing a wireless hands-free wearable and/or hand-held device according to the invention, the user can be notified of other detected wearable and/or handheld mobile electronic devices without having to have his wearable and/or handheld mobile electronic device, such as a mobile phone at hand, e.g. by not having to hold the mobile phone and not having to fumble it out of his bag or briefcase when notified. The wireless hands-free device may be adapted to, independent of a mobile electronic device, retrieve information regarding the detected mobile electronic device and notify the user of the wireless hands-free device. The wireless hands-free device may also transmit the information, i.e. a unique ID of a detected mobile electronic device, to the mobile electronic device which is connected to the wireless hands-free device in order for the mobile electronic device to retrieve the information regarding the detected mobile electronic device.

The above and further objects are also achieved by a method for directional proximity detection, comprising at least one wearable and/or handheld mobile electronic device adapted to communicate wirelessly, the method comprises receiving, by means of a first wearable and/or handheld mobile electronic device, at least one wireless signal from a second wearable and/or handheld mobile electronic device by means of an antenna array on the first wearable and/or handheld mobile electronic device; and calculating, by means of the first wearable and/or hand-held mobile electronic device, spatial information regarding the second wearable and/or hand-held mobile electronic device by means of the signal/-s transmitted from the second wearable and/or handheld mobile electronic device to the first wearable and/or handheld mobile electronic device; and configuring a notification for the user of the first wearable and/or handheld mobile electronic device based on at least the spatial information regarding the second wearable and/or handheld mobile electronic device; and notifying the user of the first wearable and/or handheld mobile electronic device of the second wearable and/or handheld mobile electronic device, e.g. its whereabouts. By providing a wearable and/or handheld mobile electronic device according to the above, a user of the first wearable and/or handheld mobile electronic device is able to be notified of the presence of the second wearable and/or handheld mobile electronic device, e.g. its whereabouts, such as a relative direction and be presented with information regarding the second wearable and/or handheld detected mobile electronic device. The form or type of notification may be graphical, optical (rendering on a display, e.g. visors), haptic, tactile (in the form of vibrations), and/or audible (sounds in speaker of a smart phone or in ear phones), which notification may be only information of the identity of the other wearable and/or handheld mobile device or of its relative direction and/or distance in a one-way communication or the start of a two-way communication between the at least two wearable and/or handheld mobile devices. Hence, this notification may be realized in a very simple and quick way to and for the user of the first wearable and/or handheld mobile electronic device enabling the user to for example choose a desirable action or the device may be predeterminately set to perform a certain desirable action or switch on or off a certain function of the first wearable and/or handheld mobile device. Furthermore, the direction can be calculated with high accuracy without having to rely on satellites or external antennas i.e. the spatial information regarding the wearable and/or handheld mobile electronic device can be determined by the first wearable and/or handheld mobile electronic device alone.

The above are also achieved by below aspects of the invention, and further objects and features will appear from the following detailed description of aspects of the invention.

According to another aspect of the disclosure, it provides a method for directional proximity detection, wherein the first wearable and/or handheld mobile electronic device determines a unique ID for the second wearable and/or handheld mobile electronic device by means of the signal/-s transmitted from the second wearable and/or handheld mobile electronic device to the first wearable and/or handheld mobile electronic device. By providing a method for determining a unique ID for the second wearable and/or handheld mobile electronic device, the first wearable and/or handheld mobile electronic device can identify and retrieve information regarding said second wearable and/or handheld mobile electronic device. Furthermore, the spatial information that is calculated can be coupled to corresponding unique ID to ensure correct notification of information to the user of the first wearable and/or handheld mobile electronic device.

According to a further aspect of the disclosure, it provides a method for directional proximity detection, wherein the first wearable and/or handheld mobile electronic device uses the unique ID for the second wearable and/or handheld mobile electronic device to retrieve information associated with the user of the second wearable and/or handheld mobile electronic device. By providing a method for determining a unique ID, e.g. a BTMAC ID or other unique identifier, information coupled to the unique ID can be retrieved from a server by the first wearable and/or handheld mobile electronic device and notified to a user of the first wearable and/or handheld mobile electronic device. The information that is stored in the server in connection to the unique ID can be altered by the user of the first wearable and/or handheld mobile device with corresponding unique ID such that that user can choose what information that is retrievable by other wearable and/or handheld mobile electronic devices.

According to yet another aspect of the disclosure, it provides a method for directional proximity detection, wherein the first wearable and/or handheld mobile electronic device notifies the user of the first wearable and/or handheld mobile electronic device of the identity information associated with the second wearable and/or handheld mobile electronic device by the aid of the spatial information associated with the second wearable and/or handheld mobile electronic device. By providing a method for using the spatial information to notify the user of the identity information regarding the user of the second wearable and/or handheld mobile electronic device, the notification can be made more precise. For instance, if the second wearable and/or handheld mobile electronic device is detected at a certain direction in relation to the first wearable and/or handheld mobile electronic device, the notification comprising identity information can be presented to the user of the first wearable and/or handheld mobile electronic device correspondingly to alert the user of the first wearable and/or handheld mobile electronic device of both the direction and the identity information regarding the second wearable and/or handheld mobile electronic device simultaneously.

According to yet another aspect of the disclosure, it provides a method for directional proximity detection, wherein the first wearable and/or handheld mobile electronic device notifies the user of the first wearable and/or handheld mobile electronic device by means of rendering an overlay at a position on a display, which position is determined by using the spatial information associated with the second wearable and/or handheld mobile electronic device. By providing a method for rendering a visual overlay which position is determined by using the spatial information associated with the second wearable and/or handheld mobile electronic device, information can be accurately presented to the user of the first wearable and/or handheld mobile electronic device. Information can be rendered as an overlay in a position corresponding to the position of the second wearable and/or handheld mobile electronic device as viewed through the first wearable and/or handheld mobile electronic device e.g. as viewed through a pair of augmented reality visors.

According to a further aspect of the disclosure, it provides a method for directional proximity detection, wherein the first wearable and/or handheld mobile electronic device notifies the user of the first wearable and/or handheld mobile electronic device by means of generating an audio signal, which audio signal is determined by using the spatial and/or identity information associated with the second wearable and/or handheld mobile electronic device. By providing a method for using an audio signal as notification to a user of a first wearable and/or handheld mobile electronic device, an effective way of notifying the user of the spatial information such as the relative direction and identity of the user carrying a second wearable and/or handheld mobile electronic device. The audio signal can be sounding from a certain direction corresponding to relative position of the second wearable and/or handheld mobile electronic device to indicate where the second wearable and/or handheld mobile electronic device is located to the user of the first wearable and/or handheld mobile electronic device.

According to a further aspect of the disclosure, it provides a method for directional proximity detection, wherein the first wearable and/or handheld mobile electronic device notifies the user of the first wearable and/or handheld mobile electronic device by means of controlling an audio stream by using the spatial information associated with the second wearable and/or handheld mobile electronic device. By providing a method for controlling an audio stream by using the spatial information associated with the second wearable and/or handheld mobile electronic device can e.g. the audio stream from an ongoing conversation with a user of the second wearable and/or handheld mobile electronic device be controlled such that the audio is generated in the first wearable and/or handheld mobile electronic device corresponding to the position of the second wearable and/or handheld mobile electronic device. Thereby can the user of the first wearable and/or handheld mobile electronic device in a simple way locate the direction to the second wearable and/or handheld mobile electronic device by listening to which direction the audio, generated by the speaker system associated with the first wearable and/or handheld mobile electronic device, is coming from.

According to another aspect of the disclosure, it provides a method for directional proximity detection, wherein the first wearable and/or handheld mobile electronic device notifies the user of the first wearable and/or handheld mobile electronic device by means of generating a tactile signal, which tactile signal is determined by using the spatial and/or identity information associated with the second wearable and/or handheld mobile electronic device. By providing method for using a tactile signal as a notification to the user of the first wearable and/or handheld mobile electronic device can be notified by only being in contact with the first wearable and/or handheld mobile electronic device. The tactile signals may be varied depending on the spatial information, e.g. the relative position of the second wearable and/or handheld mobile electronic device and the identity of the user of the second wearable and/or handheld mobile electronic device, e.g. emit a signal on one side of the first wearable and/or handheld mobile electronic device that increases in strength as the second wearable and/or handheld mobile electronic device approaches the first wearable and/or handheld mobile electronic device and thereby giving the user of the first wearable and/or handheld electronic device information regarding both the relative direction and the relative distance to the second wearable and/or handheld mobile electronic device.

According to a further aspect of the disclosure, it provides a method for directional proximity detection according to any preceding claim, wherein the first wearable and/or handheld mobile electronic device transmits the spatial information to the second wearable and/or handheld mobile electronic device. By providing a method for transmitting the spatial information calculated by the first wearable and/or handheld mobile electronic device regarding the second wearable and/or handheld mobile electronic device to the second wearable and/or handheld mobile electronic device, the spatial information can be used by the second wearable and/or handheld mobile electronic device to determine its own location in relation to the first wearable and/or handheld mobile electronic device.

According to a yet another aspect of the disclosure, it provides a method for directional proximity detection, wherein the first wearable and/or handheld mobile electronic device notifies the user of the first wearable and/or handheld mobile electronic device of the spatial information comprising the direction to the second wearable and/or handheld mobile electronic device in relation to the first wearable and/or handheld mobile electronic device. By providing a method for notifying the user of the first wearable and/or handheld mobile electronic device of the direction of the second wearable and/or handheld mobile electronic device, i.e. the relative direction compared to the orientation of the first wearable and/or handheld mobile electronic device, a way of making a user of the first wearable and/or handheld mobile electronic device aware of the relative direction of the second wearable and/or handheld mobile electronic device is provided.

According to a yet another aspect of the disclosure, it provides a method for directional proximity detection, wherein the first wearable and/or handheld mobile electronic device uses motion sensors to compensate for movements and rotations of the antenna array during the receiving and/or transmitting of at least one wireless signal. To further enhance the precision of the direction detection, rotations and other movements of the antenna array during the transmitting and/or receiving of a measurement signal package can be compensated for by using accelerometer, gyro and/or magnetometer to detect such movements.

It should be added that the following description of the embodiments is for illustration purposes only and should not be interpreted as limiting the disclosure exclusively to these embodiments/aspects.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Figure 1:
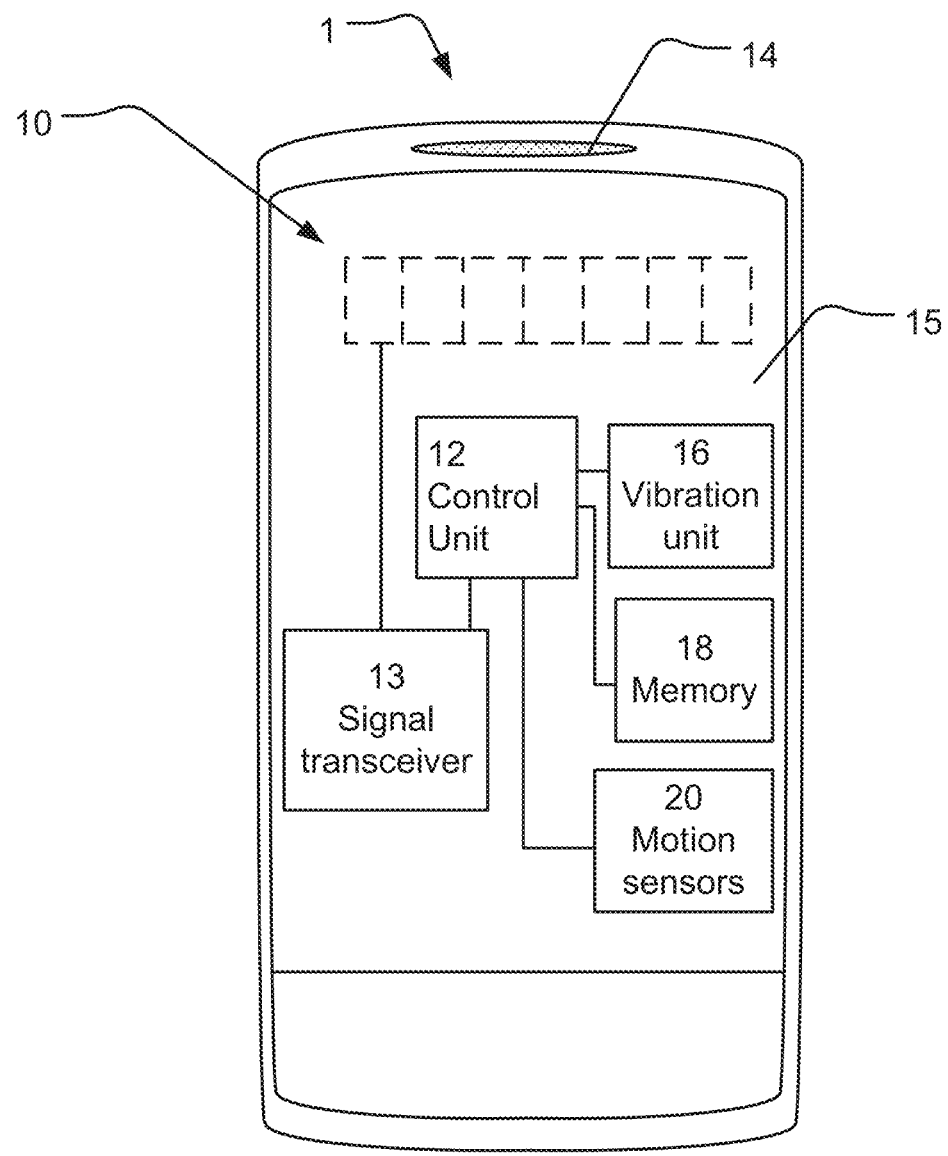
FIG. 1 illustrates a mobile electronic device where the present invention can be implemented.

FIG. 1 illustrates a mobile electronic device 1. Examples of such devices are mobile phones, glasses with integrated displays, augmented reality visors, touch pads, a wireless handsfree device, e.g. a Bluetooth headset or a "lifelogger" being able to take photos for documenting an every-day life for a user etc.

Figure 7:
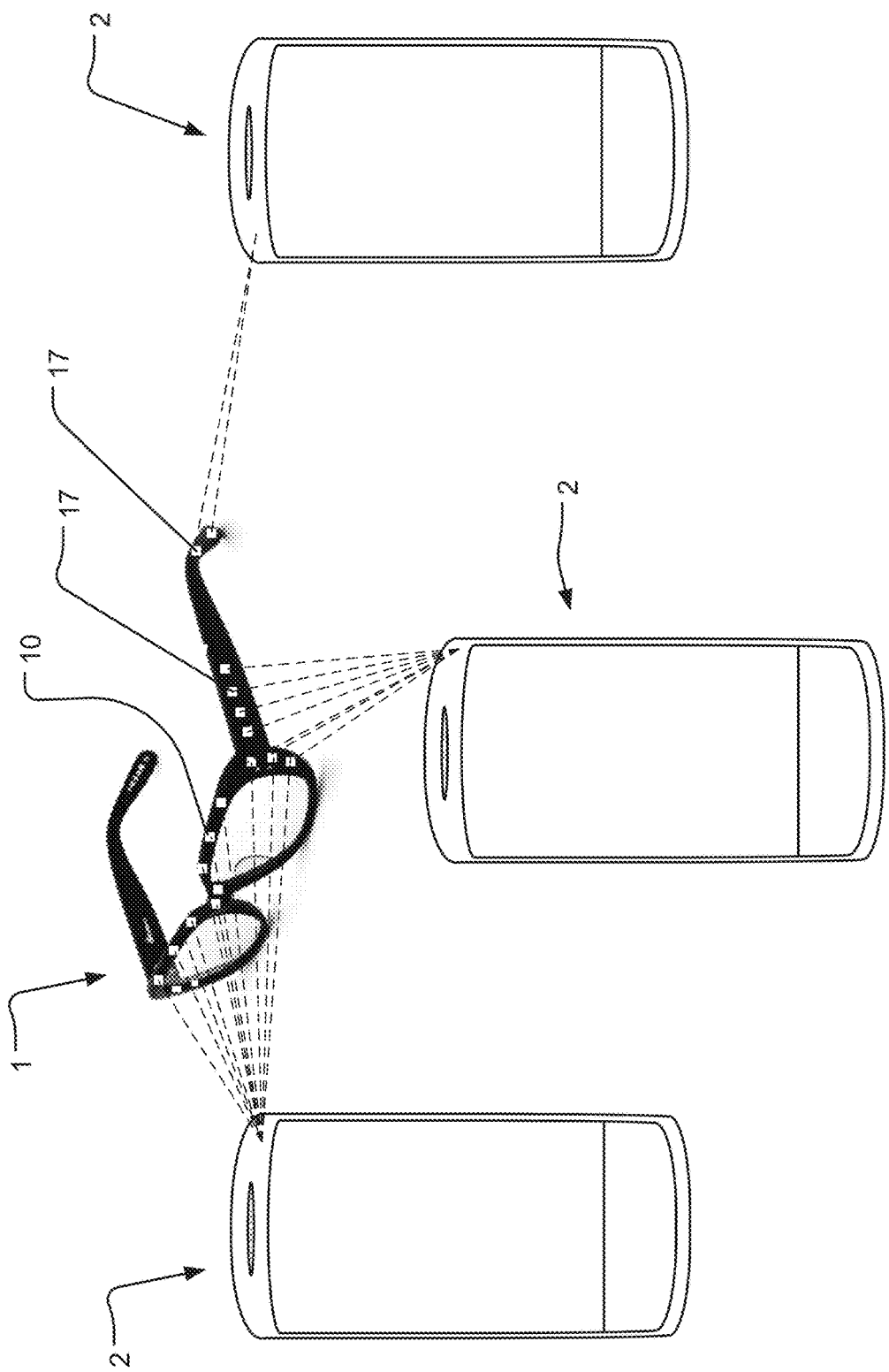
FIG. 7 illustrates an exemplary application of the invention where a first, tracking mobile electronic device in the shape of a pair of augmented reality visors receives signal/-s from three other tracked mobile electronic devices in the shape of mobile phones and from three different directions and/or positions, vertically and/or horizontally, and/or distances.

The first i.e. the tracking mobile electronic device 1 comprises an antenna array 10 according to the invention which includes a plurality of antenna elements, preferably less than 10 elements, ideally 5-7 elements which are separated with a predetermined distance, each being able to receive and send a signal e.g. a Bluetooth signal, a low energy Bluetooth signal, a WLAN signal etc. The antenna array 10 is operatively connected to a signal transceiver 13 to enable wireless communication i.e. receive and send e.g. a Bluetooth signal, a WLAN signal etc. The antenna array 10 is adapted to receive signals from and/or transmit signals to at least one second mobile electronic device 2 that is to be tracked by the first mobile electronic device 1 or vice versa, the first mobile electronic device 1 is instead tracked by the second mobile electronic device 2. The antenna array 10 may also transmit and/or receive a switched signal, i.e. the active antenna segments are switched at predetermined time intervals. The second, tracked mobile electronic device 2 comprises at least a regular wireless communication antenna and/or an antenna array 10 capable of transmitting and/or receiving signals that is receivable by the antenna array 10 in the first, tracking mobile electronic device 1. The first mobile electronic 1 device may also comprise a regular wireless communication antenna. In FIG. 7, a tracking wearable mobile electronic device 1 in the form of visors is in the detectable vicinity of three other mobile electronic devices 2. One handheld second mobile electronic device 2 is in front of the user of the visors. Another handheld mobile electronic device 2 is located essentially behind the user of the visors, i.e. this other hand-held mobile electronic device 2 is placed in a direction being substantially 180° to the direction in which the user of the visors is facing, i.e. the other handheld mobile electronic device 2 may be arranged at the direction opposite the direction the visors 1 are facing. This angle of direction between the first tracking wearable mobile electronic device 1 and the other rear handheld mobile electronic device/-s 2 may deviate from the direction in which the user is facing at angles between 45° and 180°. The third handheld mobile electronic device 2 is located essentially sideways/laterally of the user of the visors, i.e. this third handheld mobile electronic device 2 is placed in a direction substantially perpendicular to the direction in which the user of the visors is facing. Hence, the tracking wearable mobile electronic device 1 according to the invention may detect other wearable and/or handheld mobile electronic devices 2 being located within an angle of 360° around it. The tracking wearable mobile electronic device 1 according to the invention may detect other wearable and/or handheld mobile electronic devices 2 being located all around it. The tracking wearable mobile electronic device 1 according to the invention may detect other wearable and/or handheld mobile electronic devices 2 being located on all sides.

The characteristics and contents of the signals that is received by the different antenna elements in the antenna array 10 is analyzed by a control unit 12 which further comprises software and a memory 18. The control unit 12 is operatively connected to the signal transceiver 13. The control unit 12 is adapted to calculate spatial information regarding the second, tracked mobile electronic device 2. The spatial information may comprise the angle between the tracking mobile electronic device 1 and the tracked mobile electronic device 2. The calculation of the relative angle is based on analyzing received I&Q samples when a known signal is sequentially coupled to multiple transmit or receive antennas, which is a technique known in the art and will not be described in further detail.

Furthermore, the angle that is detected can be combined with a relative distance between the first mobile electronic device 1 and the second mobile electronic device 2 that is determined by measuring the strength of the signal from the second mobile electronic device 2 when received by the first mobile electronic device 1. The determined distance can be used to display a distance to the tracked mobile electronic device 2 in said tracking mobile electronic device 1 or to determine the size of the displayed information regarding the tracked mobile electronic device 2.

The relative distance between the first mobile electronic device 1 and the second mobile electronic device 2 may be determined by measuring the time difference of arrival (TDOA) of the signal from the second mobile electronic device 2 when received by the first mobile electronic device 1. The determined distance can be used to display a distance to the tracked mobile electronic device 2 in said tracking mobile electronic device 1 or to determine the size of the displayed information regarding the tracked mobile electronic device 2.

Furthermore, the relative distance between the first mobile electronic device 1 and the second mobile electronic device 2 may be determined by measuring the round trip time (RTT) of the signal from the second mobile electronic device 2 when received by the first mobile electronic device 1. The determined distance can be used to display a distance to the tracked mobile electronic device 2 in said tracking mobile electronic device 1 or to determine the size of the displayed information regarding the tracked mobile electronic device 2.

The tracking mobile electronic device 1 is further adapted to notify the user of the tracking mobile electronic device 1 of the presence of at least one second mobile electronic device 2 in a predetermined way.

A first way of notifying a user of a tracking mobile electronic device 1 that another mobile electronic device 2 is approaching is to use tactile signaling, i.e. vibrations that are provided by at least one vibration unit 16. The vibrations can occur when an approaching mobile electronic device 2 is detected. The vibrations can be directional, i.e. when another mobile electronic device 2 approach from a certain direction, the first, tracking mobile electronic device 1 vibrates on the corresponding side facing the approaching, tracked mobile electronic device 2 to indicate the approach direction. The vibrations can also occur with different frequencies and sequences depending on if the e.g. the approaching mobile electronic device is a known device or not.

A second way of notifying a user of a tracking mobile electronic device 1 that another mobile electronic device 2 is approaching is to use sound signals that are provided by at least one speaker 14. The sound signals occur when an approaching device is detected. The sound signals can be directional, i.e. when another mobile electronic device approaches from a certain direction, the first, tracking mobile electronic device sounds a signal from a speaker on the corresponding side facing the approaching, tracked mobile electronic device. The sound signal can further be different depending on the approaching, tracked mobile electronic device 2, i.e. it can read out information regarding the approaching mobile electronic device 2 or the user of said approaching device. The sound signals may be in the form of an audio signal or several audio signals or an audio stream. The method may control an audio stream by using the spatial information associated with the second mobile electronic device. Hence, the audio stream from an ongoing conversation with the user of a second mobile electronic device 2 can be controlled such that the audio is generated in the first mobile electronic device 1 corresponding to the position of the second mobile electronic device 2. Thereby can the user of the first mobile electronic device 1 in a simple way locate the direction to the second mobile electronic device 2 by listening to which direction the audio, generated by the speaker system associated with the first mobile electronic device 1, is coming from i.e. similar to a surround sound system.

A third way of notifying a user of a tracking mobile electronic device 1 that another mobile electronic device 2 is approaching or is in the vicinity is to use visual notifications that are displayed/rendered on a display 15 of the tracking mobile electronic device 1. The visual notifications occur when an approaching device 2 or a device 2 in the vicinity is tracked. The visual notifications can comprise a message containing identification information regarding the tracked mobile electronic device 2 or the user of the tracked mobile electronic device 2. In a preferred embodiment, visual identification information regarding the tracked mobile electronic device 2 is rendered as a overlay in a position on a display 15 corresponding to the position that the tracked mobile device 2 has when viewed by a user through the tracking mobile electronic device 1 e.g. as viewed through a pair of augmented reality visors 1. The relative angle between the first, tracking mobile electronic device 1 and the second, tracked mobile electronic device 2 that is calculated by the control unit 12 with use of the signals transmitted by the tracked mobile electronic device 2 is used to determine where to render the information regarding the tracked mobile electronic device 2. To further enhance the precision of the rendering position and to ensure that the rendered information in the users field of view follows the position of the tracked mobile electronic device 2 when the relative angle between the two changes, a gyroscope, a accelerometer and/or a magnetometer can be applied to compensate the position of the rendering for movements of the tracking mobile electronic device 1. To achieve a high refresh rate of the rendering of the information regarding the tracked device 2, the position can be recalculated using the signals transmitted from the tracked device 2 and compensated according to the above. To further enhance the precision of the direction detection, rotations and other movements of the antenna array 10 during the transmitting and/or receiving of a measurement signal package can be compensated for by using motion sensors 20 e.g. accelerometer, gyro and/or magnetometer to detect such movements.

Figure 2A:
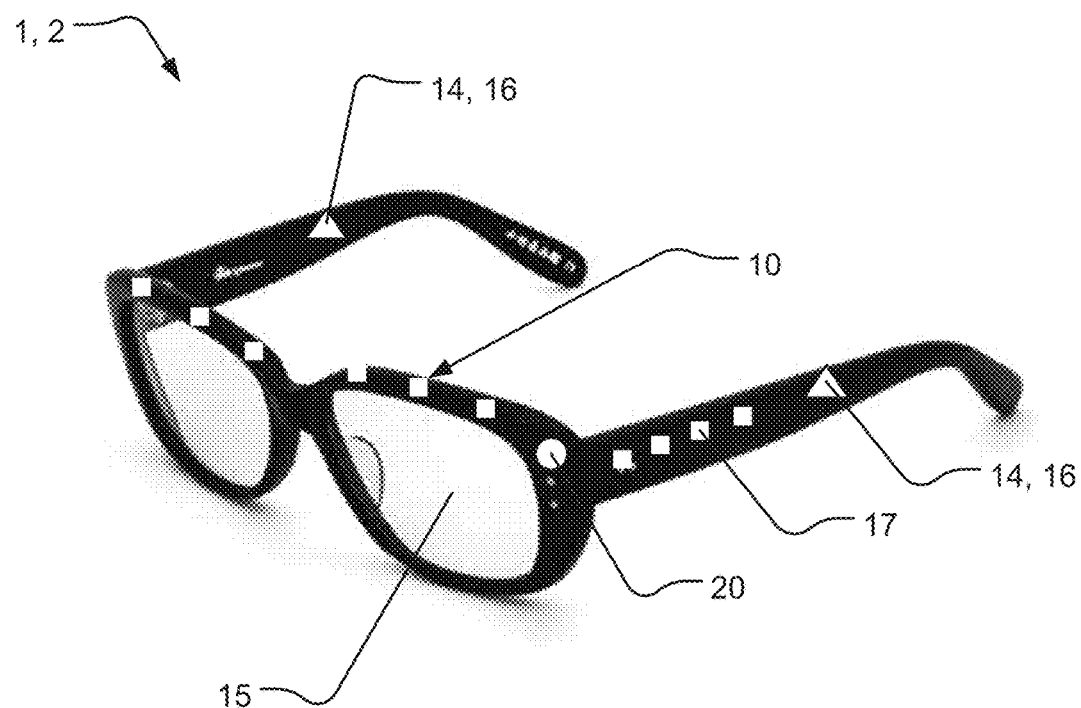
FIGS. 2A and 2B illustrate mobile electronic devices where the present invention can be implemented.
Figure 2B:
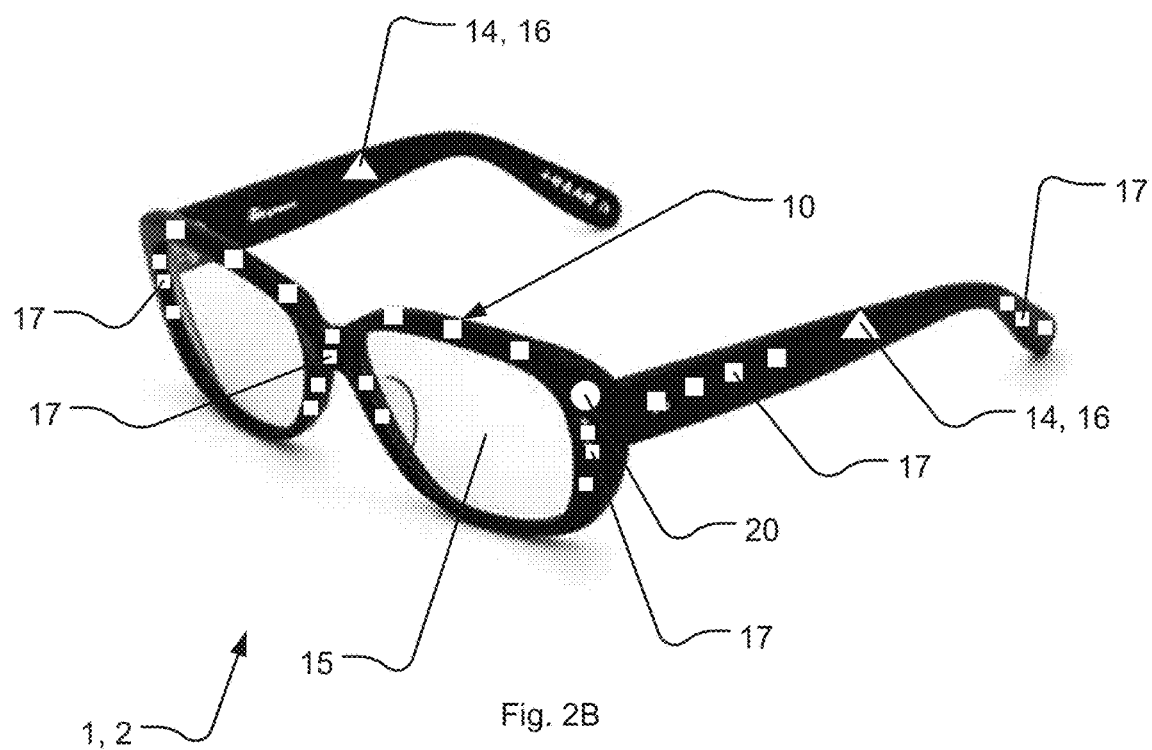

FIGS. 2A and 2B show a mobile electronic device 1 in the shape of a pair of augmented reality visors 1, comprising means 15 for displaying information in the field of view of the user. The visors further comprises at least one antenna array 10 that is arranged in the frame of the visors 1 or integrated into the glass. For tracking mobile electronic devices that are located in front of the tracking augmented reality visors 1, the antenna array 10 is mounted on the part of the frame and/or glass facing forwards, e.g. essentially perpendicular to the direction the visors are facing. For tracking of wearable and/or handheld mobile electronic devices that are located to the side of the tracking visors 1, further antenna arrays 17 can be arranged on the sides of the frame, i.e. on the sidepieces of the visors (see FIG. 2A). Further antenna arrays 17 may be arranged substantially vertically or vertically on the frame, i.e. on the sidepieces of the visors and/or on the middle part of the visor frame connecting the pair of glasses/displays 15 together (see FIG. 2B). Further antenna arrays 17 may be arranged substantially vertically or vertically on the frame, i.e. on the sidepieces of the visors at the back of the visor frame, i.e. at the part of the sidepieces that are placed behind the ears of user and/or at the users head and/or around the users head (see FIG. 2B). The further arrays 17 may be arranged so that they follow the contour and design of the frame and its sidepieces and middle pieces and pieces around the glasses, e.g. if the frame is bent and/or rounded, the antenna arrays may essentially follow the bends. The further arrays 17 may partly follow the bends while partly extend essentially straight vertically and/or horizontally and/or inclined depending on the design of the visors.

Figure 8:
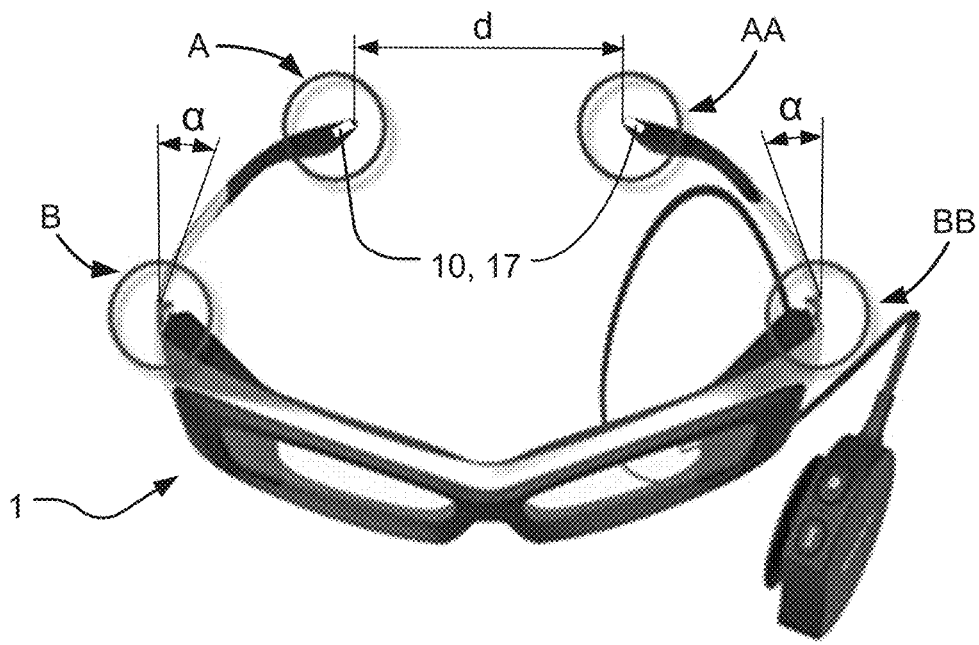
FIGS. 8 and 9 illustrate wearable and/or handheld mobile devices where the present invention is implemented.

The tracking first wearable mobile electronic device 1 according to the invention may detect and identify other wearable and/or handheld mobile electronic devices 2 and persons wearing and/or carrying these devices in front of the user. The tracking first wearable mobile electronic device 1 according to the invention may detect and identify other wearable and/or handheld mobile electronic devices 2 and persons wearing and/or carrying these devices in 360 degrees around the user of the first wearable mobile electronic device 1. This is achieved in that the first wearable mobile electronic device 1 comprises antenna arrays 10, 17 being arranged at the front and sides of frames of visors. This is achieved in that the first wearable mobile electronic device 1 comprises antenna arrays 10, 17 being arranged at the end of the frame and/or sidepieces of the visors at the back of the head or neck of the user and facing backwards (see FIG. 8 at circles A and AA, and at the end of the visors sidepieces in FIG. 9). To be able to use the antenna elements as an antenna array 10, 17 to determine direction, the distance d (see distance d defined by arrows between the end pieces of the visors in FIG. 8) between the antenna elements 10, 17 must be known. This is accomplished by making the frame and its side-pieces/bows of the visors 1 hard enough so that they do not flex significantly and then measure the angles $\alpha$ at the hinges of the frame at the glasses/displays 15 to calculate the distance d (see FIG. 8, angle $\alpha$ at circles B and BB). The angle $\alpha$ may be defined as the angle between the sidepieces of the visors 1 when they are folded or in a first extreme predetermined position. This first extreme predetermined position may be when the sidepieces are fully deflected outwards, i.e. fully folded out (not in), to be put on a head, until an end position of the hinged connection in one direction (se arrows O in FIG. 9 for the folding out direction). This first extreme predetermined position may be defined as angle $\alpha=0°$ or $90°$ or an angle therebetween or even larger than $90°$. Another extreme position may be when the sidepieces are fully deflected inwards, i.e. fully folded in (not out), to be stored after removal from a head, until an end position of the hinged connection in another direction (se arrows I in FIG. 9 for the folding in direction). Another extreme position may be when the sidepieces are fully deflected inwards, i.e. fully folded in (not out), e.g. to be stored after removal from a head, until the ends of the sidepieces come into contact with the main frame with glasses/displays 15 of the visors (se arrows I in FIG. 9 for the folding in direction). This other or second extreme predetermined position may be defined as angle $\alpha=180°$ or $90°$. The distance d being zero may be defined by folding the sidepieces of the frame of the visors 1 together until their ends are in contact and register the angle $\alpha$ at this position being an intermediate position between the two extreme innermost and outermost positions above. A user with a smaller head requiring the sidepieces to be not fully folded out when wearing the visors 1 means that the distance d between the antenna elements of the antenna array 10, 17 may be calculated in relation to how much, in degrees, the actual angle $\alpha$ then deviates from the first extreme and predetermined position for the sidepieces, i.e. when fully folded out. This smaller distance d may also be calculated by reducing the maximum and predetermined distance d as measured in the fully folded out state of the visor sidepieces in correspondence to the difference in degrees between the maximum and predetermined angle $\alpha$ (at the fully folded out state of the side pieces) and the not as large angle $\alpha$ for the user with the smaller head when sidepieces are not fully folded out or in, i.e. when the sidepieces are in the intermediate position.

Figure 9:
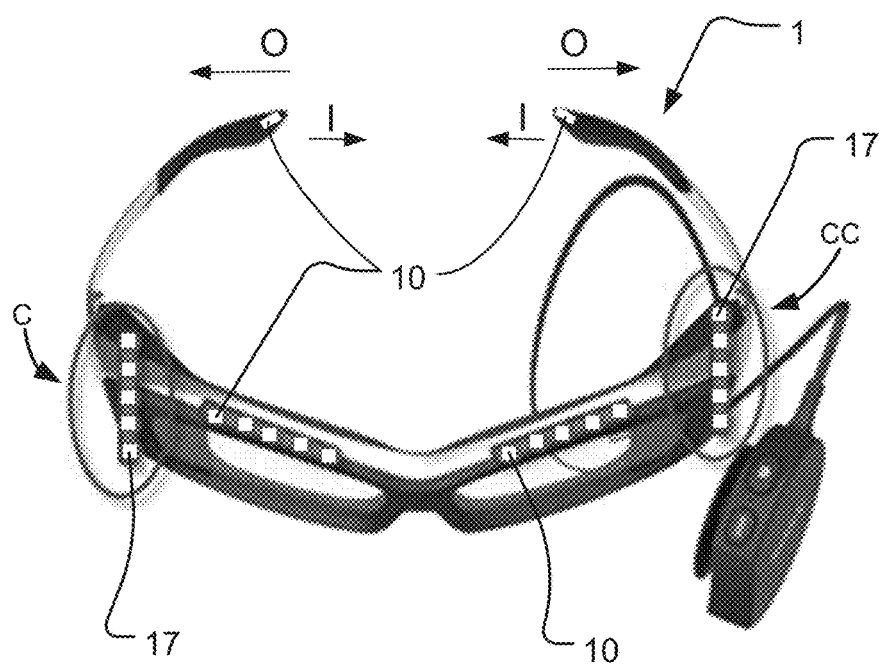

The tracking first wearable mobile electronic device 1 according to the invention may detect and identify other wearable and/or handheld mobile electronic devices 2 and persons wearing and/or carrying these devices by comprising also vertical antenna arrays 17 on the front of the glasses 15 in addition to the horizontal ones 10 (see FIGS. 2B, 7 and at circles C and CC in FIG. 9). This makes it possible to estimate the Z-axis direction to the other wearable and/or handheld mobile electronic devices 2 and/or their users. This will make it possible to put the overlay information in the glasses/displays 15 of the visors 1 on the right/correct height and hence ensure a proper overlay of the tracked object/the other wearable and/or handheld mobile electronic device 2 as well as the possibility to remove the overlay in case the user is looking up or down too much to keep the object/the other wearable and/or handheld mobile electronic device 2 in sight. This also makes it possible to differentiate different devices located on top of each other. It will also be possible to combine this information with the accelerometer data in the visors 1 (by means of earth gravity) to decide if the other wearable and/or handheld mobile electronic device 2 and/or its user is on the same height, above or below the visors 1 (and presumably the head of the user). That information can among other usages be used to better distinguish what kind of object is being tracked by the visors 1.

Figure 3:
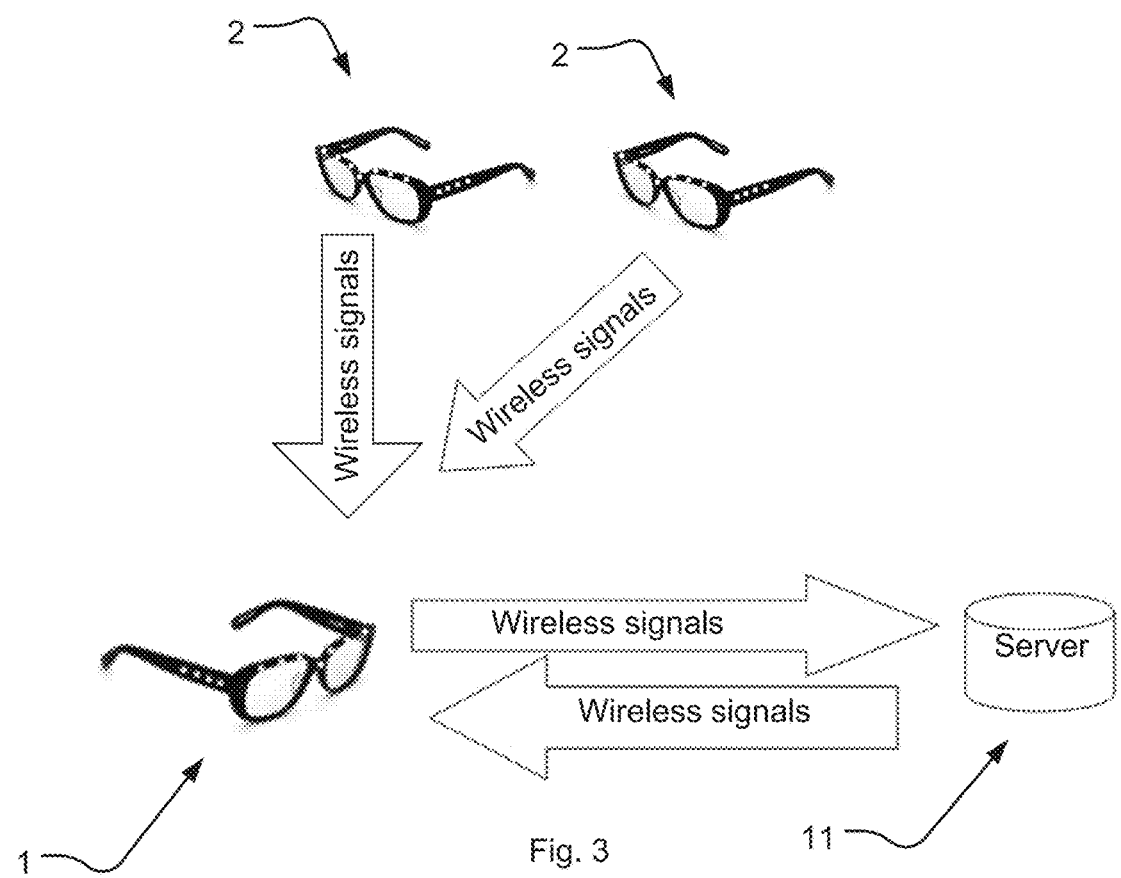
FIG. 3 illustrates an exemplary application where the present invention is implemented.

FIG. 3 shows three wearable and/or handheld mobile electronic devices in the form of augmented reality visors. Another example of wearable and/or handheld mobile electronic devices is shown in FIG. 7 where the tracking wearable and/or handheld mobile electronic device 1 is a visor while three other wearable and/or handheld mobile electronic devices 2 are in the form of mobile phones 2 at differing positions, vertically and/or horizontally, different distances and different directions in relation to the tracking visors 1. The tracking device 1 receives signals from the tracked devices 2 enabling the tracking device 1 to locate the tracked devices 2. The signals further comprise a respective unique ID depending on the standard used by the associated devices, e.g. an unit, Mac or device ID for the tracked devices, in this case a BTMAC ID but this can be any type of unique network identifier. The units IDs are then sent to a server 11 to retrieve public information that is connected to the respective unit ID, by performing a lookup in a web registry, and then a public source, e.g. the Facebook page of the user that is connected to the unit ID (see the exemplary information in glass/display 15 of FIG. 5). The web registry maps unit IDS to public IDs, e.g. the Facebook IDs of the users of the devices. The control unit 12 can then determine where to render the retrieved information in the display 15 of the visors 1 so that it becomes an overlay which is attached to the corresponding tracked wearable and/or handheld mobile electronic device/-s 2. Face detection can further be used to improve the accuracy of the rendering, i.e. to ensure that the positioning of the rendered information in the display 15 of the visors 1 does not obstruct the view of the user of the tracked device/-s 2.

Figure 4:
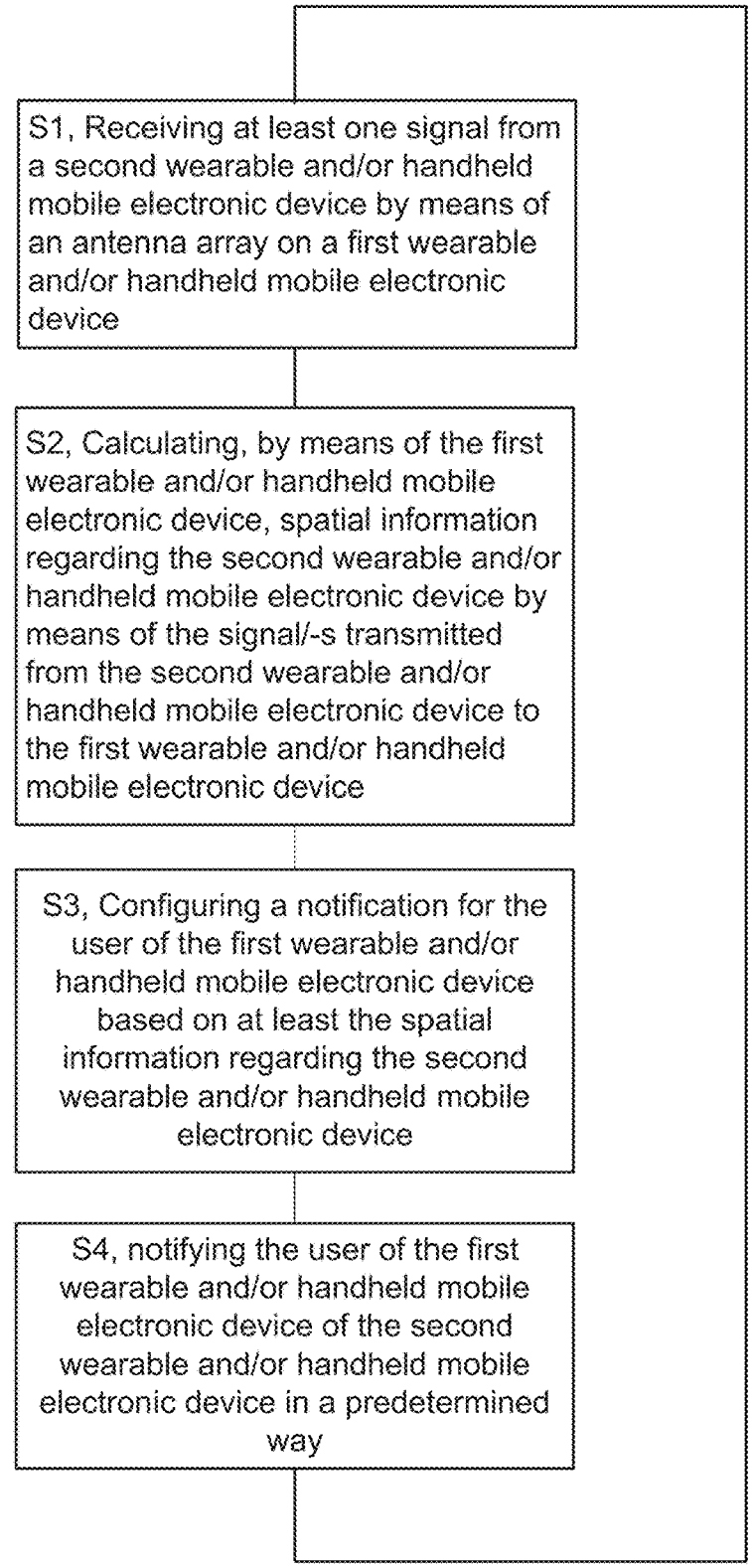
FIG. 4 illustrates a flowchart of a method according to the present invention for directional proximity detection of mobile electronic devices by a mobile electronic device.

FIG. 4 shows a flowchart of the method for notifying a user of a tracking mobile electronic device 1 that tracked mobile electronic device/-s 2 is/are detected. The first step S1 of the method is to receive at least one signal from a second wearable and/or handheld mobile electronic device 2 by means of at least one antenna array 10, 17 on a first, tracking wearable and/or handheld mobile electronic device 1.

The second step S2 of the method is to calculate, by means of a control unit 12 in the first wearable and/or handheld mobile electronic device 1, spatial information regarding the second wearable and/or handheld mobile electronic device 2 by means of the signal/-s transmitted from the second wearable and/or handheld mobile electronic device 2 to the first wearable and/or handheld mobile electronic device 1. The signal/-s that is received from the second wearable and/or handheld mobile electronic device 2 can comprise a unique unit ID. The control unit 12 registers unit IDs and makes sure that the unit IDs are connected to corresponding spatial information. The control unit 12 is adapted to calculate spatial information that comprises the angle and/or distance and/or the position, i.e. vertically and/or horizontally, to the tracked, second wearable and/or handheld mobile electronic device 2.

Step three, S3, comprises configuring a notification for the user of the first wearable and/or handheld mobile electronic device 1 based on at least the spatial information regarding the second wearable and/or handheld mobile electronic device 2. The control unit 12 can further be adapted to use the spatial information in combination with information gathered from a server 11 using the unit ID of the second wearable and/or handheld mobile electronic device 2. The information that is gathered from the server is registered by the user of the second wearable and/or handheld mobile electronic device 2 in advance; alternatively the information or some of the information may also be gathered automatically by the server 11. The control unit 12 combines the information gathered from the server 11 with the corresponding spatial information and uses it to notify the user of the first, tracking wearable and/or handheld mobile electronic device 1 that a second, tracked wearable and/or handheld mobile electronic device 2 is detected or is in the vicinity. The notification can comprise a directional vibration, a directional sound signal that can also be comprising information regarding the second, tracked wearable and/or handheld mobile electronic device 2, or a visual, rendered overlay in a position on a display 15 on the first device 1 corresponding to the position of the second, tracked wearable and/or handheld mobile electronic device 2 as seen through the first, tracking wearable and/or handheld mobile electronic device 1 e.g. as seen through a pair of visors 1. The notification can also be a combination of these alternatives.

Step four, S4, comprises notifying the user of the first, tracking wearable and/or handheld mobile electronic device 1 of the second, tracked wearable and/or handheld mobile electronic device 2 in a predetermined way. The predetermined way can be any of the alternatives above or a combination of these.

Figure 5:
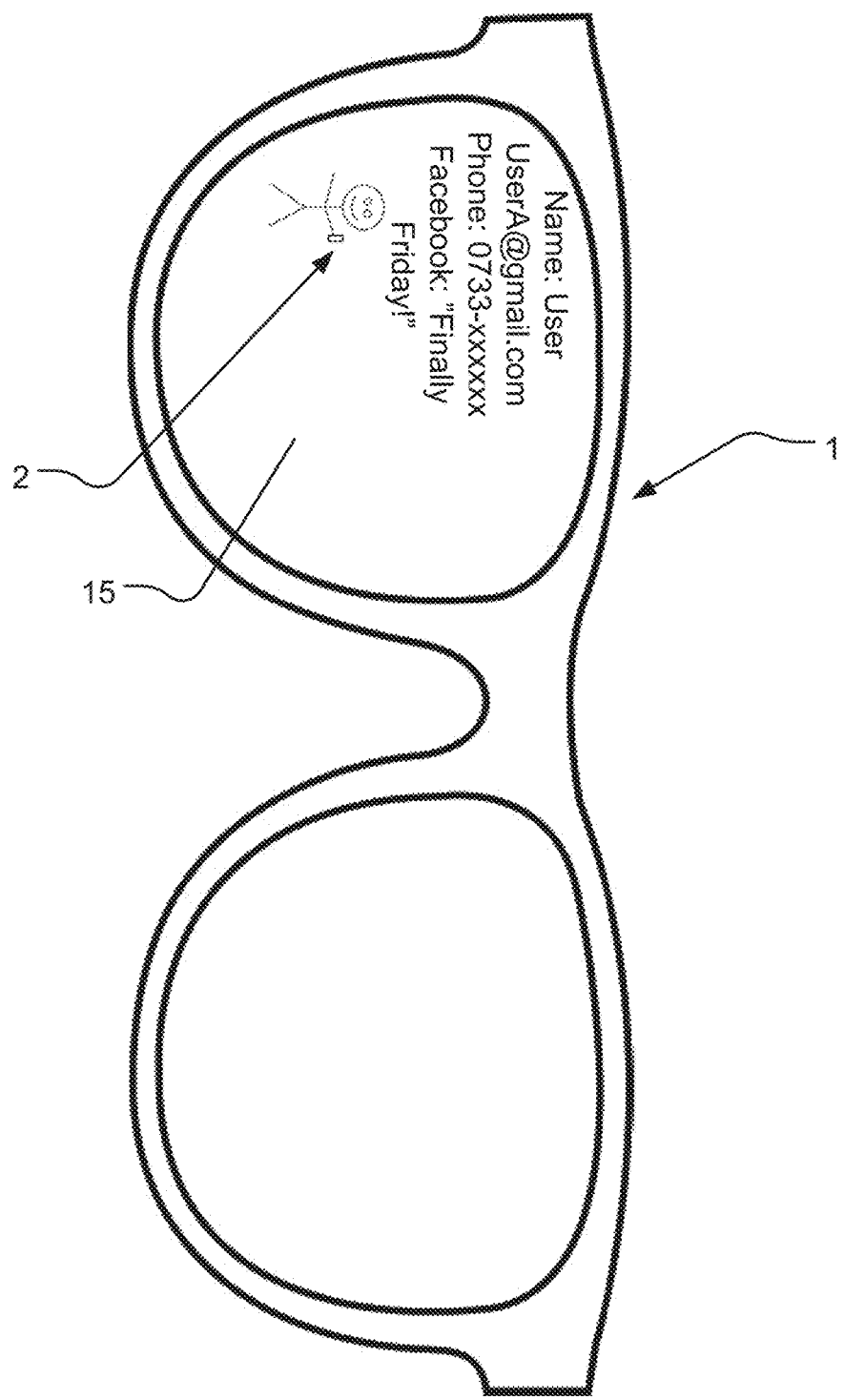
FIG. 5 illustrates an exemplary application of the present invention where a first, tracking mobile electronic device in the shape of augmented reality visors detects a second, tracked mobile electronic device and is notified of certain identity parameters of the second mobile electronic device as an overlay in the visors.

FIG. 5 shows an exemplary application of the present invention where a first wearable and/or handheld, tracking mobile electronic device 1 in the form of augmented reality visors 1 detects/has detected a second wearable and/or handheld, tracked mobile electronic device 2. The signals from the tracked device 2 are received by the antenna array 10, 17 and the spatial information is calculated. The unit ID is used to retrieve the corresponding user information from the server 11 and the control unit 12 in the tracking device 1 renders the information on the position calculated by the control unit 12 in the tracking device 1 using at least the spatial information. The process is repeated to ensure that the information is rendered in the correct position and to ensure that the information regarding the tracked device 2 is kept up to date. Face recognition, a gyroscope and accelerometers can be applied to improve the accuracy of the rendering. The visors can also be connected to another electronic device e.g. a wireless handsfree device via Bluetooth and thereby allow the connected device to be active in the notification of the user e.g. by producing a sound signal or vibration.

Figure 6:
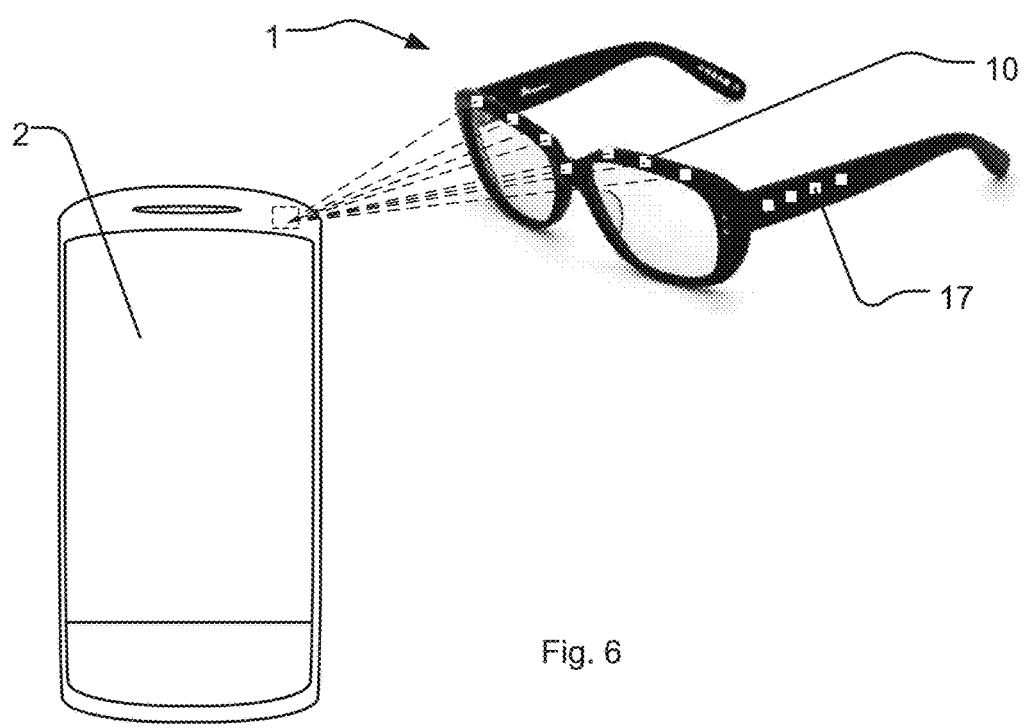
FIG. 6 illustrates an exemplary application of the invention where a first, tracking mobile electronic device in the shape of a pair of augmented reality visors receives signal/-s from a second, tracked mobile electronic device in the shape of a mobile phone.

FIG. 6 shows another exemplary application of the invention where a first, tracking mobile electronic device 1 in the shape of a pair of augmented reality visors 1 receives signal/-s from a second, tracked mobile electronic device 2 in the shape of a mobile phone 2. The tracking mobile electronic device 1 can, by analyzing the signals e.g. by calculating the Angle of Arrival, determine the angle in the horizontal plane between the first tracking mobile electronic device 1 and the tracked mobile electronic device 2. The technique of calculating Angle of Arrival is known in the art and will not be described in further detail. The array can also be positioned in another direction, e.g. vertically, to provide an angle in the vertical plane that can be combined with the angle in the horizontal plane to provide a three dimensional calculation of the position of the second wearable and/or handheld, tracked mobile device 2 by the first wearable and/or handheld, tracking mobile electronic device 1 (see FIGS. 2B, 7, 8, and 9).

Another example of application of the invention is shown in FIG. 3, here a first, tracking wearable mobile electronic device 1 in the shape of a pair of augmented reality visors 1 receives signal/-s from at least one other tracked wearable mobile electronic device 2 in the shape of a pair of augmented reality visors. Yet another example of application of the invention is shown in FIG. 3 where a first, tracking mobile electronic device 1 is in the shape of a pair of augmented reality visors 1 and receives signal/-s from a second, tracked mobile electronic device 2 in the shape of a second pair of augmented reality visors and a third tracked wearable mobile electronic device 2 in the shape of a third pair of augmented reality visors. Any or all of these visors in FIG. 3 may comprise at least one antenna array 10 arranged on the visor 1, 2 substantially in parallel or in parallel with the sidepieces of the visor. Any or all of these visors in FIG. 3 may comprise at least one antenna array 17 arranged substantially vertically or vertically in relation to the longitudinal direction of the sidepieces/bows of the visor. Alternatively, at least one of these visors in FIG. 3 may comprise at least one antenna array 10 arranged on the visor 1, 2 substantially in parallel or in parallel with the sidepieces of the visor and at least one antenna array 17 arranged substantially vertically or vertically in relation to the longitudinal direction of the sidepieces/bows of the visor 1, 2. The invention also applies to user cases when the visors 1 are rotated around an axis substantially in parallel with or in parallel with the longitudinal axis of its sidepieces, i.e. when the visors are tilted and rotated sideways if the user nods or moves his head to the side (not forwards). The invention applies to user cases when the visors 1 are rotated around an axis substantially perpendicular to or perpendicular to the longitudinal axis of its sidepieces, i.e. when the visors are tilted forwards or backwards when the user nods forwards or backwards or moves his head while rotating it forwards or backwards, e.g. when looking up or down. The invention also applies to user cases when the visors 1 are rotated around an axis substantially perpendicular to or perpendicular to the longitudinal axis of its sidepieces and substantially vertical or vertical in relation to the horizontal plane, i.e. when the visors are tilted and rotated as the user turns his head to the left or right, e.g. when looking to the side.

The invention claimed is:

1. A first wearable electronic device for directional proximity detection, comprising:
    a frame member that supports at least one lens, wherein the frame member is arranged in a first plane;
    a first temple member that extends from a first side of the frame member, wherein the first temple member is disposed in a second plane different from the first plane;
    a second temple member that extends from a second side of the frame member that is opposite the first side, wherein the second temple member is arranged in a third plane different from the first and second plane;
    an antenna array including at least three antenna elements separated by a predetermined distance, the antenna array operatively connected to a signal transceiver configured for wireless communication, wherein a first antenna element of the at least three antenna elements is arranged on the frame member or the at least one lens, a second antenna element of the at least three antenna elements is arranged on the first temple member, and a third antenna element of the at least three antenna elements is arranged on the second temple member; and
    a control unit comprising software and memory for the wireless communication, wherein the control unit is operatively connected to the signal transceiver,
    wherein the control unit is configured to:
    receive, by means of the antenna array and the signal transceiver, at least one wireless signal from a second wearable or handheld mobile electronic device,
    calculate spatial information regarding the second wearable or handheld mobile electronic device by means of the signal transmitted from the second wearable or handheld mobile electronic device to the first wearable electronic device,
    configure a notification for the user of the first wearable electronic device based on at least the spatial information regarding the second wearable or handheld mobile electronic device, and to notify the user of the first wearable electronic device of the second wearable or handheld mobile electronic device.

2. The first wearable electronic device according to claim 1, wherein the antenna array faces in the substantially same direction as the user is facing.

3. The first wearable electronic device according to claim 2, wherein the antenna array is arranged to receive signals originating from the second wearable or handheld mobile electronic device in the front view of the user.

4. The first wearable electronic device according to claim 1, wherein the antenna array faces a direction being substantially perpendicular to the direction the user is facing.

5. The first wearable electronic device according to claim 1, wherein the antenna array faces in a direction being substantially opposite the direction the user is facing.

6. The first wearable electronic device according to claim 1, wherein the antenna array is arranged to receive signals originating from the second wearable or handheld mobile electronic device located at the rear of the user.

7. The first wearable electronic device according to claim 1, wherein at least one antenna array is arranged substantially in parallel with the first and second temple members.

8. The first wearable device according to claim 1, wherein at least one antenna array is arranged substantially vertically in relation to the longitudinal direction of the first and second temple members.

9. The first wearable device according to claim 1, wherein at least one antenna array is arranged substantially in parallel with the first and second temple members and at least one antenna array is arranged substantially vertically in relation to the longitudinal direction of the first and second temple members.

10. The first wearable electronic device according to claim 1, wherein the second plane and the third plane lie in the x-y axis, and are spaced apart from one another in the z axis.

11. The first wearable electronic device according to claim 10, wherein the second and third plane are parallel to one another.

12. A method for directional proximity detection, comprising a one mobile wearable electronic device adapted to communicate wirelessly, the mobile wearable electronic device including a frame member that supports at least one lens, wherein the frame member is arranged in a first plane, a first temple member that extends from a first side of the frame member, wherein the first temple member is disposed in a second plane different from the first plane, and a second temple member that extends from a second side of the frame member that is opposite the first side, wherein the second temple member is arranged in a third plane different from the first and second plane, the method comprising:

receiving, by means of the first wearable electronic device, at least one wireless signal from a second wearable electronic device by means of an antenna array on the first wearable electronic device, the antenna array including at least three antenna elements separated by a predetermined distance, wherein a first antenna element of the at least three antenna elements is arranged on the frame member or the at least one lens, a second antenna element of the at least three antenna elements is arranged on the first temple member, and a third antenna element of the at least three antenna elements is arranged on the second temple member, calculating, by means of the first wearable electronic device, spatial information regarding the second wearable or handheld mobile electronic device by means of the signal/-s transmitted from the second wearable or handheld mobile electronic device to the first wearable electronic device, configuring a notification for the user of the first wearable electronic device based on at least the spatial information regarding the second wearable or handheld mobile electronic device, and notifying the user of the first wearable electronic device of the second wearable or handheld mobile electronic device.

13. The method for directional proximity detection according to claim 12, wherein the first wearable electronic device determines a unique ID for the second wearable or handheld mobile electronic device by means of the signal/-s transmitted from the second wearable or handheld mobile electronic device to the first wearable or electronic device.

14. The method for directional proximity detection according to claim 13, wherein the first wearable electronic device uses the unique ID for the second wearable or handheld mobile electronic device to retrieve information associated with the user of the second wearable or handheld mobile electronic device.

15. The method for directional proximity detection according to claim 13, wherein the first wearable electronic device notifies the user of the first wearable electronic device of the identity information associated with the second wearable or handheld mobile electronic device by the aid of the spatial information associated with the second wearable or handheld mobile electronic device.

16. The method for directional proximity detection according to claim 12, wherein the first wearable electronic device notifies the user of the first wearable electronic device by means of rendering an overlay at a position on a display, which position is determined by using the spatial information associated with the second wearable or handheld mobile electronic device.

17. The method for directional proximity detection according to claim 12, wherein the first wearable electronic device notifies the user of the first wearable electronic device by means of generating an audio signal, which audio signal is determined by using the spatial and/or identity information associated with the second wearable or handheld mobile electronic device.

18. The method for directional proximity detection according to claim 12, wherein the first wearable electronic device notifies the user of the first wearable electronic device by means of controlling an audio stream by using the spatial information associated with the second wearable or handheld mobile electronic device.

19. The method for directional proximity detection according to claim 12, wherein the first wearable electronic device notifies the user of the first wearable electronic device by means of generating a tactile signal, which tactile signal is determined by using the spatial and/or identity information associated with the second wearable or handheld mobile electronic device.

20. The method for directional proximity detection according to claim 12, wherein the first wearable electronic device transmits the spatial information to the second wearable or handheld mobile electronic device.

21. The method for directional proximity detection according to claim 12, wherein the first wearable electronic device notifies the user of the first wearable electronic device of the spatial information comprising the direction to the second wearable or handheld mobile electronic device in relation to the first wearable electronic device.

22. The method for directional proximity detection according to claim 12, wherein the first wearable electronic device uses motion sensors to compensate for movements and rotations of the antenna array during the receiving and/or transmitting of at least one wireless signal.

* * * * *